(12) United States Patent
Hori et al.

(10) Patent No.: US 11,852,323 B2
(45) Date of Patent: Dec. 26, 2023

(54) LIGHTING DEVICE WITH COVER IN CASE FOR LIGHT EMITTER

(71) Applicant: Yazaki Corporation, Tokyo (JP)

(72) Inventors: Takahiro Hori, Shizuoka (JP); Hiroyuki Suzuki, Shizuoka (JP); Masahiro Sawayanagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/943,601

(22) Filed: Sep. 13, 2022

(65) Prior Publication Data

US 2023/0184412 A1 Jun. 15, 2023

(30) Foreign Application Priority Data

Sep. 14, 2021 (JP) ................. 2021-149127

(51) Int. Cl.
*F21V 19/00* (2006.01)
*B60L 53/10* (2019.01)
*F21Y 115/10* (2016.01)
*F21W 107/10* (2018.01)
*F21W 131/00* (2006.01)

(52) U.S. Cl.
CPC .......... *F21V 19/0035* (2013.01); *B60L 53/10* (2019.02); *F21W 2107/10* (2018.01); *F21W 2131/00* (2013.01); *F21Y 2115/10* (2016.08)

(58) Field of Classification Search
CPC ... F21V 19/0035; B60L 53/10; F21Y 2115/10
See application file for complete search history.

(56) References Cited

U.S. PATENT DOCUMENTS

| 5,545,046 A | * | 8/1996 | Masuda | B60L 53/31 |
| | | | | 439/142 |
| 11,499,692 B2 | * | 11/2022 | Hemker | F21V 23/004 |
| 2011/0151693 A1 | * | 6/2011 | Loo | B60L 50/66 |
| | | | | 439/135 |
| 2012/0212967 A1 | | 8/2012 | Sawayanagi | |
| 2013/0078839 A1 | * | 3/2013 | Musk | H01R 13/631 |
| | | | | 439/345 |
| 2014/0056000 A1 | | 2/2014 | Tsushima | |
| 2014/0347191 A1 | | 11/2014 | Suzuki | |
| 2015/0331106 A1 | | 11/2015 | Okada | |
| 2019/0217772 A1 | | 7/2019 | Ueno et al. | |

FOREIGN PATENT DOCUMENTS

| CN | 103562626 A | 2/2014 |
| EP | 2 894 677 A1 | 7/2015 |
| JP | 8-268152 A | 10/1996 |
| JP | 2013-200365 A | 10/2013 |
| JP | 2014-123595 A | 7/2014 |
| JP | 2014-207247 A | 10/2014 |
| JP | 2018-43744 A | 3/2018 |
| JP | 2021-106078 A | 7/2021 |

* cited by examiner

*Primary Examiner* — Tracie Y Green
(74) *Attorney, Agent, or Firm* — Sughrue Mion, PLLC

(57) ABSTRACT

A lighting device includes: a case made from a material allowing light to penetrate therethrough and having a cylinder shape with a closed bottom; a substrate including a light emitter configured to emit light; and a cover made from a rigid material, press-fitted and installed in the substrate so as to cover the light emitter, and installed inside the case together with the substrate.

11 Claims, 14 Drawing Sheets

COMPARATIVE EXAMPLE

COMPARATIVE EXAMPLE

COMPARATIVE EXAMPLE

COMPARATIVE EXAMPLE ly to both the front-rear direction and the longitudinal direction is referred to as a transverse direction as illustrated in FIGS. 1 and 2. Note that in the following description, directions referred to for explaining positional relationships between components of the lighting device 1 are only for explanatory convenience and do not limit actual directions when the lighting device 1 is used.

LIGHTING DEVICE WITH COVER IN CASE FOR LIGHT EMITTER

CROSS REFERENCE TO RELATED APPLICATION

The present application is based on, and claims priority from the prior Japanese Patent Application No. 2021-149127, filed on Sep. 14, 2021, the entire contents of which are incorporated herein by reference.

TECHNICAL FIELD

The disclosure relates to a lighting device.

BACKGROUND

JP 2013-200365 A proposes a display device including a case and a substrate. The case is made of a transparent or translucent member, has an opening, and is formed in a rectangular cylinder with a closed bottom. The substrate is inserted and installed in the case through the opening.

In the display device (lighting device) above, LEDs (light emitters) and light-shielding walls made of sponge material (sponges) are provided on the substrate. The sponges are fixed on the front surface of the substrate so as to surround at least partly the outer periphery side surface of at least one LED of the LEDs.

SUMMARY

Since the sponges surround the LEDs in the lighting device above, it is possible to prevent damage to the LEDs due to contact of the LEDs with the case when the substrate in which the LEDs are installed is installed inside the case.

In the lighting device above, release paper of double-sided tape is peeled from the sponges and attachment of the sponges on the substrate is performed by manually positioning the sponges on the substrate when the sponges are installed on the substrate. Thus, it takes time to install the sponges on the substrate.

Furthermore, in the lighting device above, since the sponges absorb light emitted by the LEDs depending on the color of the sponges, the sponges have a good light-shielding function but cause a reduction of the illumination intensity. Furthermore, in the lighting device above, since the sponges are vulcanized, long-term usage may cause chips of the LEDs to corrode and cause a reduction of the illumination intensity and brightness of the LEDs.

The disclosure is directed to a lighting device capable of preventing damage to a light emitter due to contact of the light emitter with a case when a substrate is installed inside the case, and reducing the time taken to install a cover on the substrate.

A lighting device in accordance with some embodiments includes: a case made from a material allowing light to penetrate therethrough and having a cylinder shape with a closed bottom; a substrate including a light emitter configured to emit light; and a cover made from a rigid material, press-fitted and installed in the substrate so as to cover the light emitter, and installed inside the case together with the substrate.

DETAILED DESCRIPTION

Various embodiments will be described hereinafter with reference to the accompanying drawings.

Figure 1:
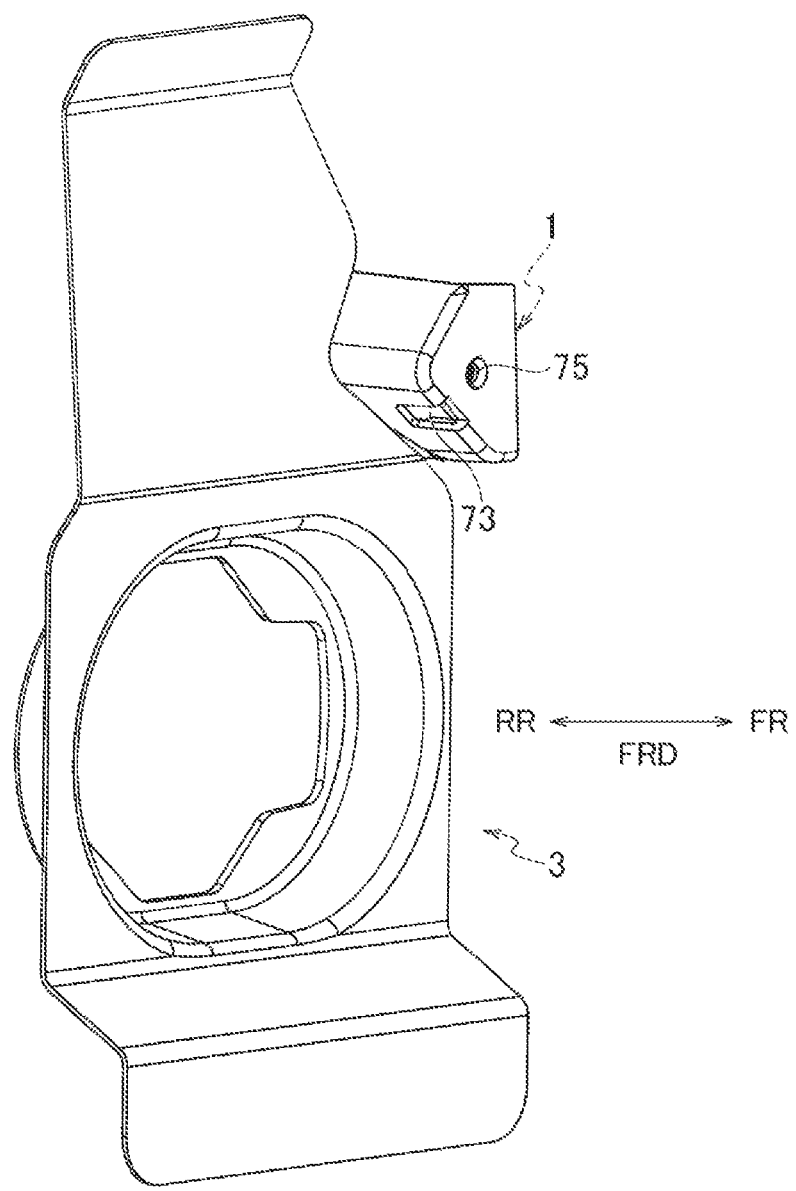
FIG. 1 is a perspective view of an attachment for a vehicle charge inlet light to which a lighting device according to an embodiment of the invention is applied.
Figure 2:
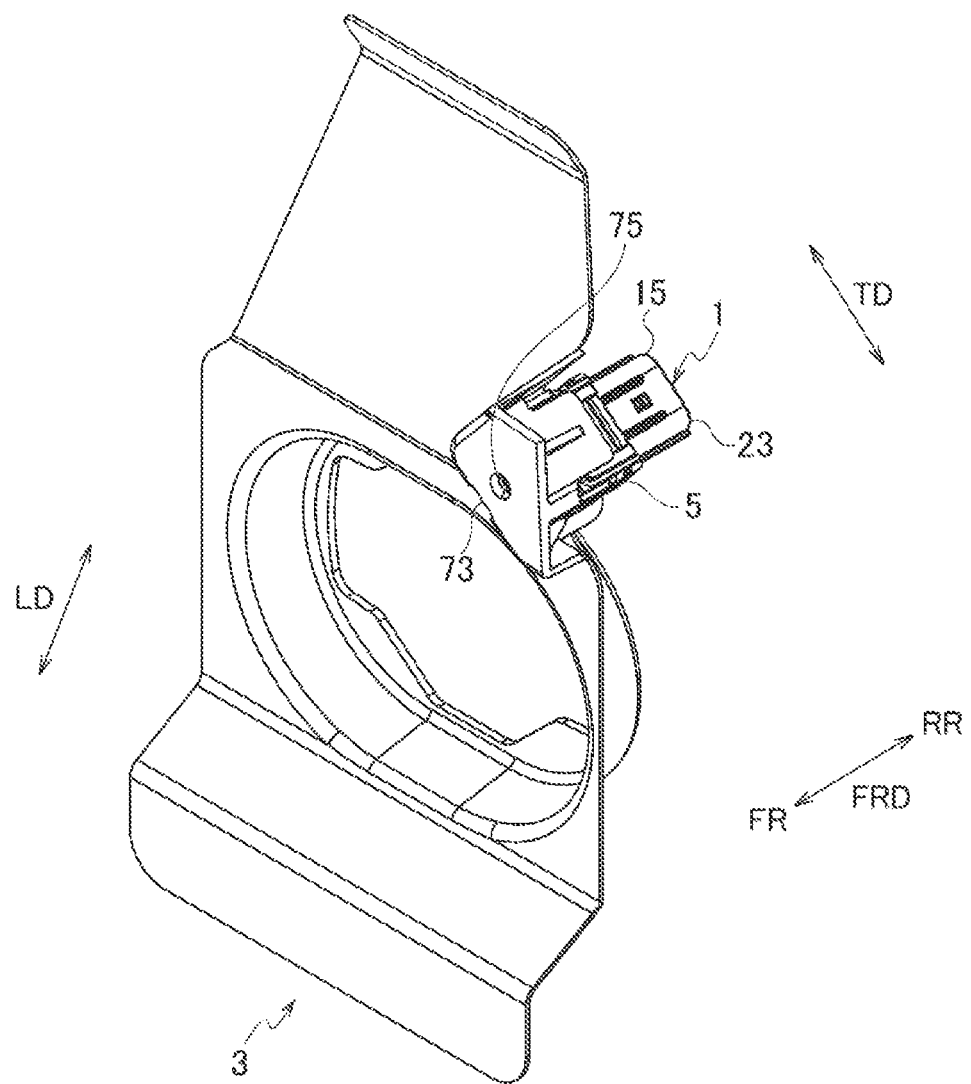
FIG. 2 is a perspective view of the attachment for the vehicle charge inlet light of FIG. 1, viewed from the direction different from FIG. 1.
Figure 3:
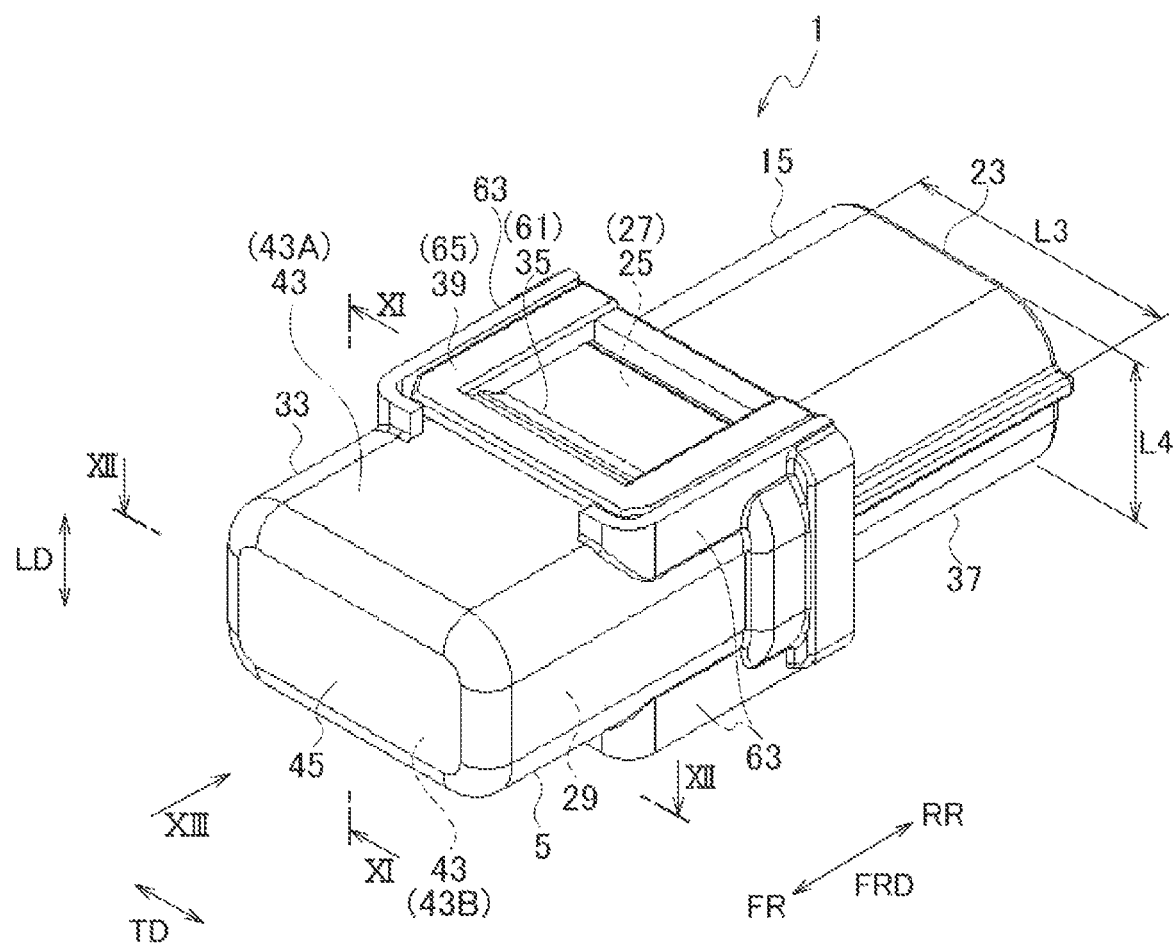
FIG. 3 is a perspective view of a lighting device according to a first embodiment of the invention.
Figure 4:
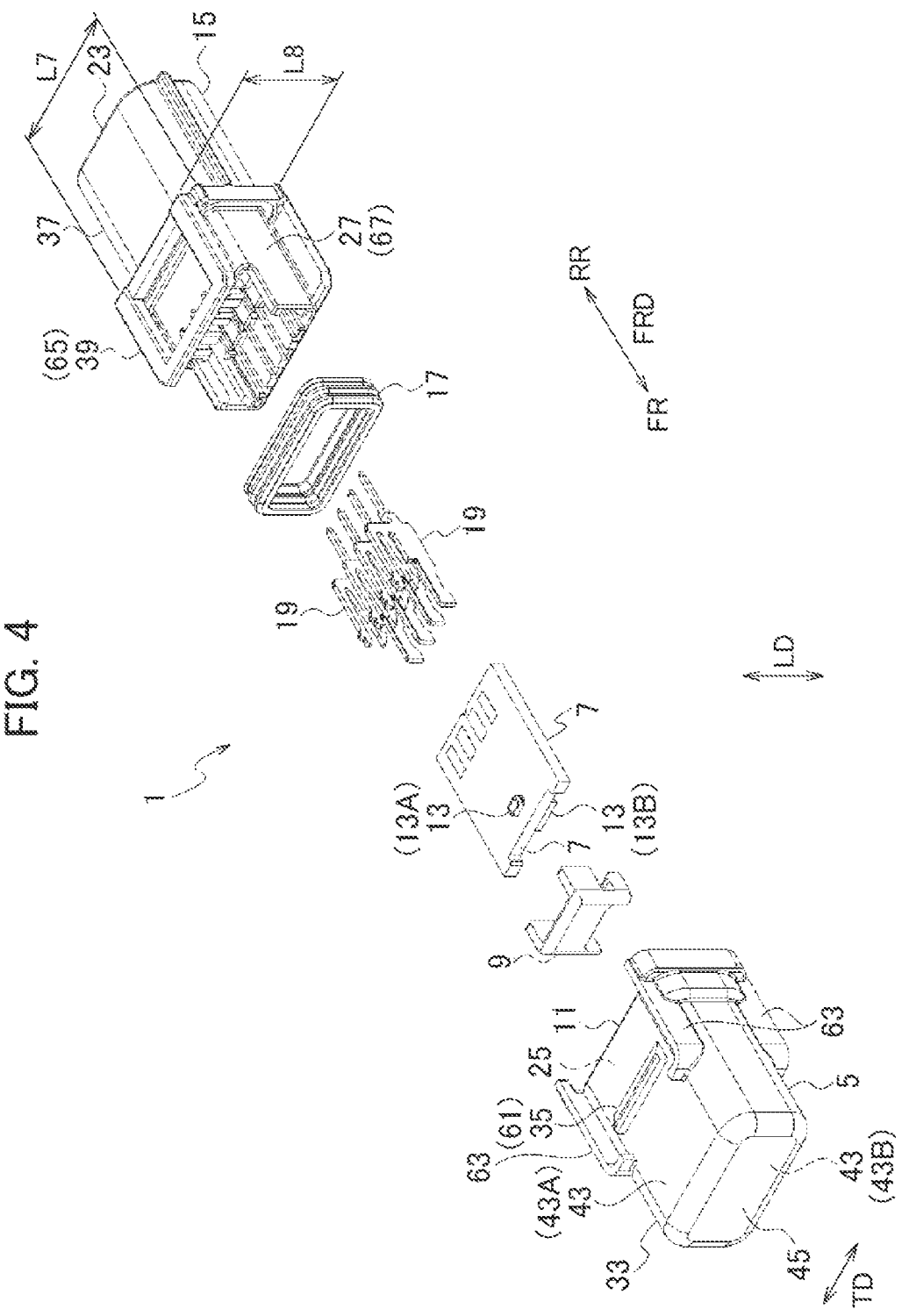
FIG. 4 is an exploded perspective view of the lighting device according to the first embodiment of the invention.

As illustrated in FIGS. 1 and 2, a lighting device 1 according to a first embodiment of the present invention is used for illumination of a charge inlet of a vehicle (vehicle charge inlet) 3, for example. As illustrated in FIGS. 3 and 4, the lighting device 1 includes a case 5, a substrate (circuit substrate) 7, and a cover 9.

For explanatory convenience, in the lighting device 1, a certain direction is referred to as a front-rear direction, a direction perpendicular to the front-rear direction is referred to as a longitudinal direction, and a direction perpendicular to the front-rear direction and the longitudinal direction is referred to as a transverse direction. In FIGS. 1 to 20, the directions of longitudinal, transverse, front, rear, and front-rear are denoted by LD, TD, FR, RR, and FRD, respectively.

The case 5 is made from a rigid material allowing light (visible light, for example) to penetrate therethrough and has a cylinder shape with a closed bottom. That is, the case 5 is made from a material such as transparent or translucent synthetic resin and has a rectangular cylinder with a closed bottom (rectangular box shape), for example. An opening 11 is formed in a rear end of the case 5.

The substrate 7 is made from a rigid material which does not allow light to penetrate therethrough and has a rectangular flat plate shape, for example. The substrate 7 includes a light emitter (an LED, for example) 13 configured to emit light (visible light, for example).

The cover 9 is made from a rigid material such as synthetic resin. The cover 9 is inserted and press-fitted in the tip end portion (front end portion) of the substrate 7 and integrally installed in the substrate 7 so as to cover the light emitter 13. The cover 9 is provided in the substrate 7 in order to prevent the light emitter 13 from hitting the inner surface of the case 5 when the substrate 7 is installed inside the case 5. The cover 9 is installed inside the case 5 together with the substrate 7 (including the light emitter 13).

The lighting device 1 further includes a housing 15, a packing 17, and terminals 19.

The housing 15 is made from a rigid material such as synthetic resin. The packing 17 is made from an elastic material such as synthetic rubber. The terminals 19 are made from a conductive material such as metal. The term "rigid" herein means a rigidity with which only a subtle elastic deformation barely visible to the naked eye is generated by a force made with a person's finger.

Figure 10:
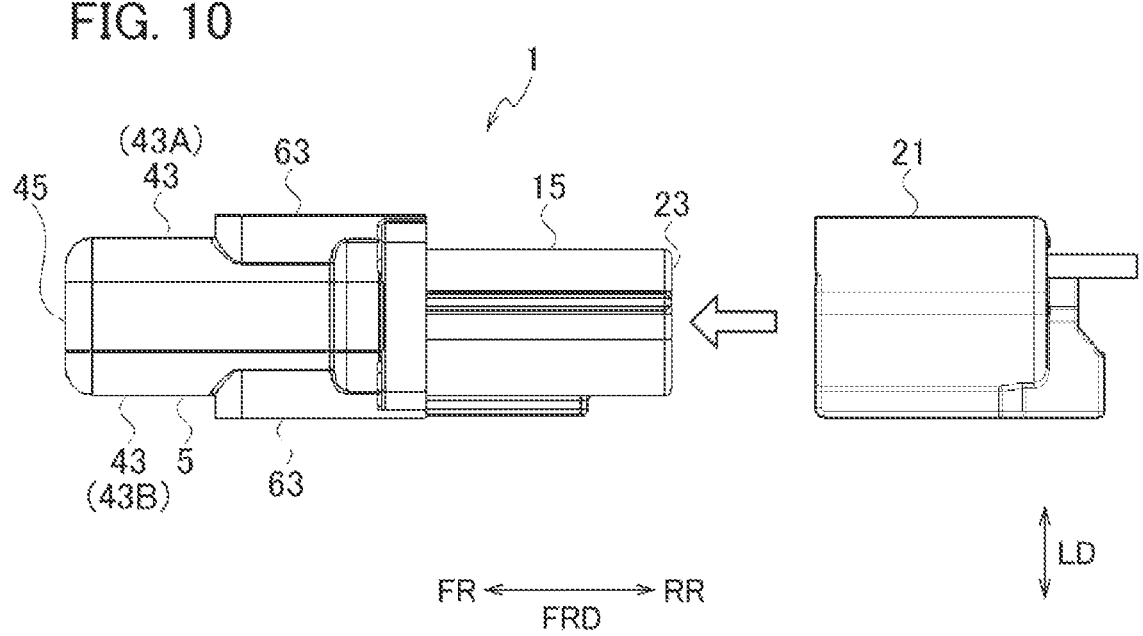
FIG. 10 is a view of the lighting device according to the first embodiment of the invention immediately before a vehicle-side connector is connected to the lighting device.

The housing 15 has a substantially cuboid shape. As illustrated in FIG. 10, a connector frontage (connector joint portion) 23 to be connected to a vehicle-side connector 21 is formed in a rear end portion of the housing 15. As illustrated in FIG. 4 and other drawings, an engaging portion 27 to be engaged with an engaged portion 25 of the case 5 is formed in a front end portion of the housing 15.

The case 5 is installed in the housing 15 in a state where the engaged portion 25 of the case 5 is engaged with the engaging portion 27 of the housing 15. Thus, an opening 11 of the case 5 is blocked and an enclosed space 29 (see FIGS. 3, 11, and 12) is formed inside the case 5. As illustrated in FIG. 4, the packing 17 has a rectangular annular shape. The packing 17 is provided in order to allow the enclosed space 29 inside the case 5 to be a confined space and prevent water and the like from coming into the enclosed space 29 from the outside of the lighting device 1. The packing 17 is provided at the site of (between) the engaged portion 25 of the case 5 and the engaging portion 27 of the housing 15 (see FIG. 12).

The terminals 19 are locked to the housing 15. The terminals 19 are provided for energization between a conductive portion (an energization portion electrically connected to the connector joint portion 23) of the housing 15 and an electronic circuit module of the substrate 7. This energization allows the light emitter 13 to emit light. The substrate 7 is fixed to the terminals 19 in a state where a rear end portion of the substrate 7 is sandwiched by the terminals 19.

In the lighting device 1, the substrate 7, the light emitter 13, the terminals 19, and the cover 9 are present in the enclosed space 29 which is formed by the case 5 and the housing 15. Thus, the substrate 7, the light emitter 13, the terminals 19, and the cover 9 are blocked and protected from the outside by the case 5 and the housing 15.

In the lighting device 1, the case 5, the housing 15, the terminals 19, the substrate 7, and the cover 9 are integrally connected to each other. In the lighting device 1, the vehicle-side connector 21 (see FIG. 10) is connected to the connector joint portion 23 of the housing 15, the light emitter 13 appropriately emits light, the light emitted by the light emitter 13 penetrates through the case 5, and then at least a part of the case 5 emits light.

The positional relationship between the case 5 and the housing 15 is set to a prescribed appropriate relationship. The housing 15 is installed in the case 5 by moving the housing 15 forward to the case 5 from a state where the case 5 and the housing 15 are away from each other.

In the lighting device 1, an illuminated surface 31 (see FIGS. 6 to 9 and 11) of the cover 9 is configured to, for example, reflect, while also diffusing, some or all light emitted by the light emitter 13 and with which the illuminated surface 31 is illuminated. The illuminated surface 31 is a surface to be illuminated with light emitted by the light emitter 13. The illuminated surface 31 includes at least a part of the cover 9.

For example, the entirety of the cover 9 is made from white non-transparent synthetic resin which is lightproof. Thus, a portion of the light emitted by the light emitter 13 and with which the illuminated surface 31 is illuminated is reflected by the illuminated surface 31.

As illustrated in FIGS. 4, 11 to 13, 17, and 18, the case 5 includes a case body 33 and locked portions 35. The case body 33 has a rectangular box shape.

Figure 13:
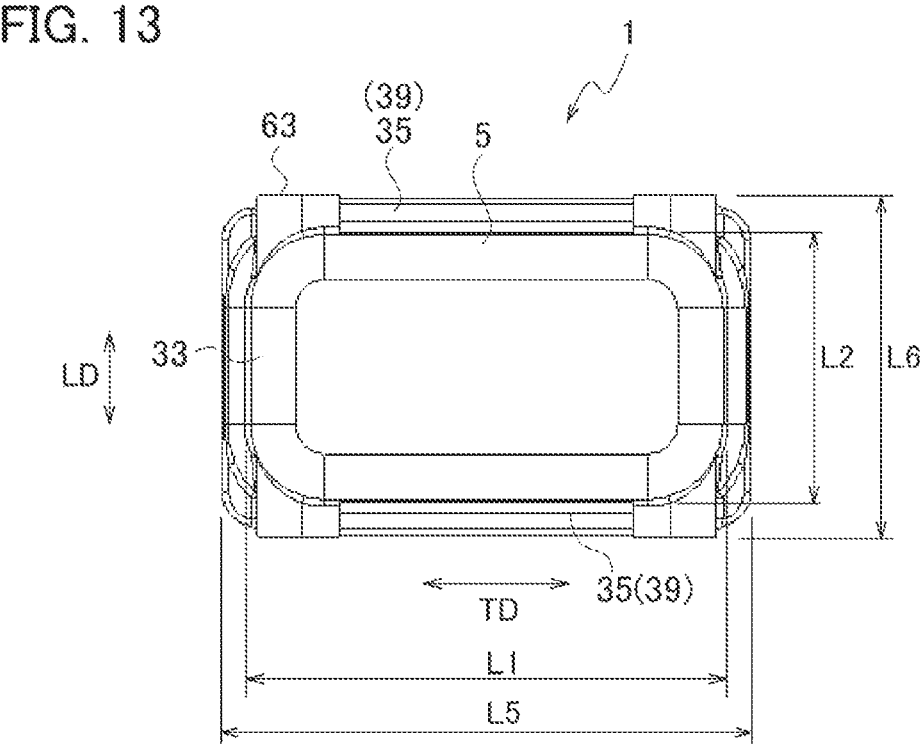
FIG. 13 is an arrow view from the XIII direction in FIG. 3.

As illustrated in FIGS. 4 and 16 to 18, the housing 15 includes a housing body 37 and locking portions 39. As illustrated in FIG. 13, the dimension value L1 of the case body 33 in the transverse direction is greater than the dimension value L2 of the case body 33 in the longitudinal direction. Similarly, as illustrated in FIG. 3, the dimension value L3 of the housing body 37 in the transverse direction is greater than the dimension value L4 of the housing body 37 in the longitudinal direction.

Figure 14:
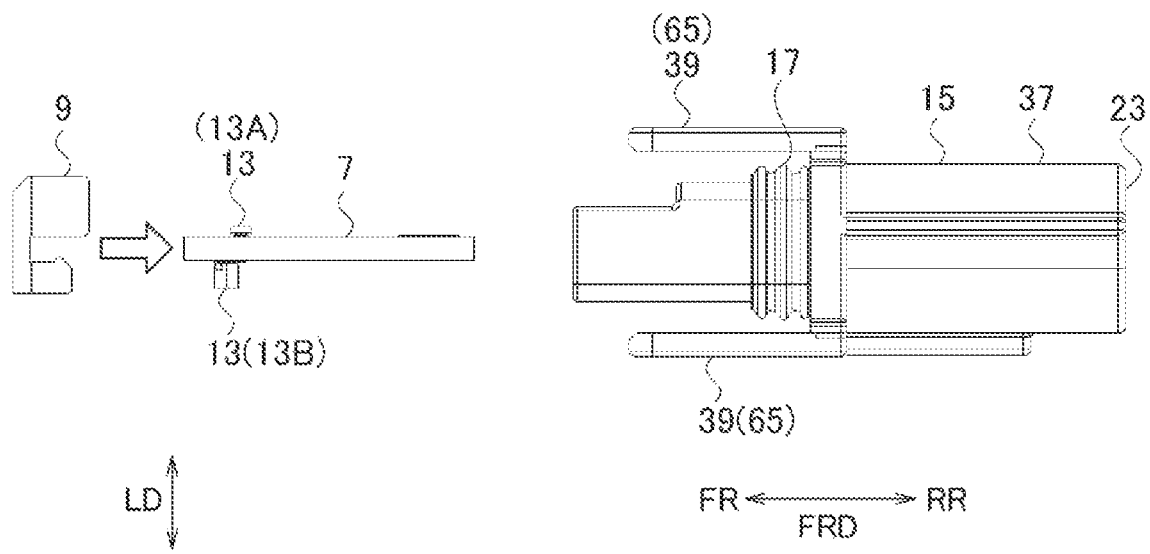
FIG. 14 is a view of the lighting device according to the first embodiment of the invention immediately before the substrate and the cover are installed in a housing.

As illustrated in FIG. 13, the locked portions 35 of the case 5 protrude from both ends of the case body 33 in the longitudinal direction. As illustrated in FIG. 14, the locking portions 39 of the housing 15 protrude from both ends of the housing body 37 in the longitudinal direction.

In the lighting device 1, the case 5 is locked to the housing 15 and integrally installed in the housing 15 by engaging the engaged portion 25 of the case 5 with the engaging portion 27 of the housing 15 and locking the locked portions 35 to the locking portions 39.

In the lighting device 1, the dimension value L5 of the case 5 in the transverse direction and the dimension value L7 of the housing 15 in the transverse direction are respectively greater than the dimension value L6 of the case 5 in the longitudinal direction and the dimension value L8 of the housing 15 in the longitudinal direction (see FIGS. 4 and 13).

Figure 12:
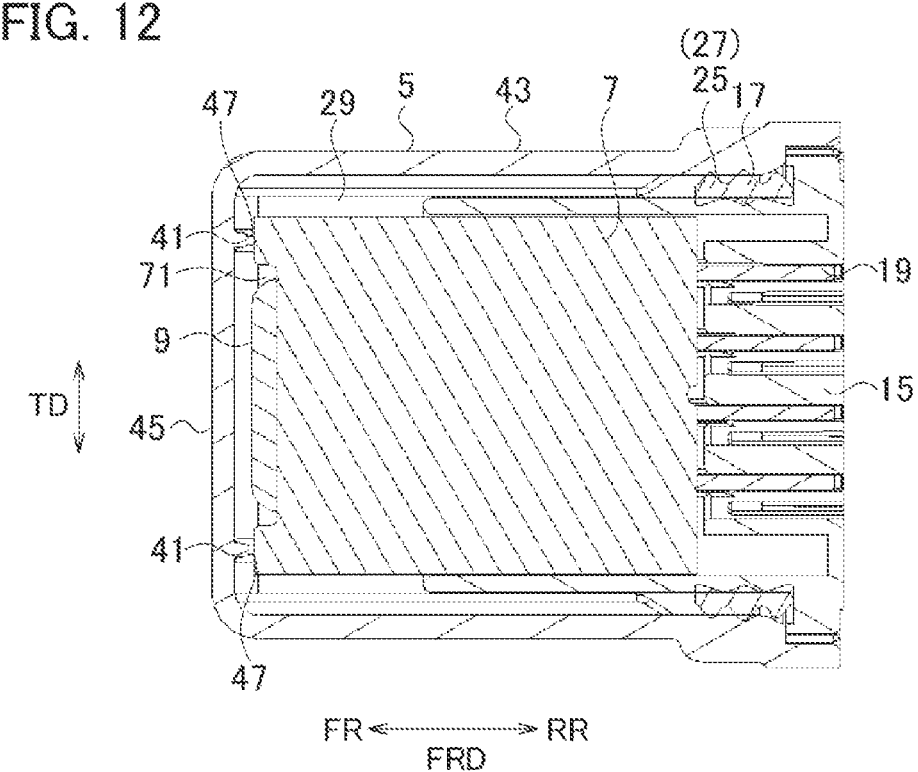
FIG. 12 is a cross-sectional view taken along the line XII-XII of FIG. 3.

As illustrated in FIG. 12, press-holding ribs 41 for holding the substrate 7 are provided inside the case 5 (case body 33). The case body 33 has a rectangular box shape and the opening 11 is located at the rear end of the case body 33 as described above. Specifically, the case body 33 includes a side wall 43 and a bottom wall 45. The side wall 43 has a rectangular cylinder shape whose central axis extends in the front-rear direction. The bottom wall 45 has a rectangular flat plate shape which closes the front end of the side wall 43.

The press-holding ribs 41 are provided in at least the bottom wall 45. The press-holding ribs 41 extend in the longitudinal direction (direction perpendicular to the sheet of FIG. 12) inside the case body 33 and slightly protrude rearward from the bottom wall 45. Recesses 47 are provided in parts (intermediate portions in the longitudinal direction) of the press-holding ribs 41. The recesses 47 are recessed forward from the rear end surfaces of the press-holding ribs 41.

The tip end portion of the substrate 7 is fitted in the press-holding ribs 41 and the substrate 7 is sandwiched by the press-holding ribs 41 with a biasing force in the longitudinal direction. Note that the press-holding ribs 41 may be integrally extended from the bottom wall 45, and may protrude from a wall surface of the inner wall of the side wall 43 separately from the bottom wall 45.

In the lighting device 1, a first light emitter 13A and a second light emitter 13B are provided as the light emitter 13. The thickness direction of the substrate 7 is the longitudinal direction.

The first light emitter 13A is provided on the front surface (front mounting surface) of the substrate 7 which is one of the surfaces of the substrate 7 in the thickness direction. The first light emitter 13A is configured to emit light with a first solid angle (see the arrows A1 of FIG. 11) from the front surface of the substrate 7 toward a direction which is away from the substrate 7 in the longitudinal direction.

The second light emitter 13B is provided on the back surface (back mounting surface) of the substrate 7 which is the other of the surfaces of the substrate 7 in the thickness direction. The second light emitter 13B is configured to emit light with a second solid angle (see the arrow B1 of FIG. 11) from the back surface of the substrate 7 toward the front direction. The value of the first solid angle is greater than the value of the second solid angle.

Figure 11:
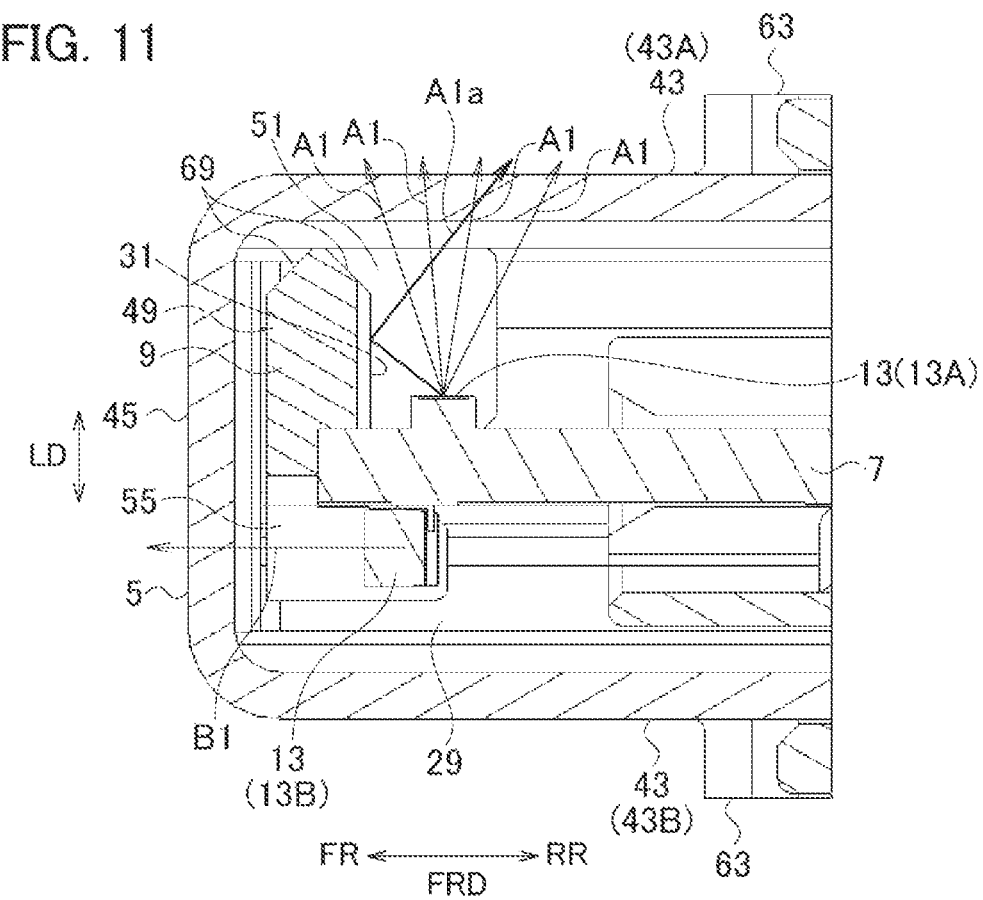
FIG. 11 is a cross-sectional view taken along the line XI-XI of FIG. 3 and indicating traveling directions of light emitted by a light emitter.

A portion of the light emitted by the first light emitter 13A is reflected by the cover 9 and then the case 5 is illuminated with the reflected light (see the arrow A1a of FIG. 11). The case 5 is directly illuminated with the remaining light emitted by the first light emitter 13A (see the arrows A1 of FIG. 11). The case 5 is directly illuminated with light emitted by the second light emitter 13B (see the arrow B1 of FIG. 11).

Figure 5:
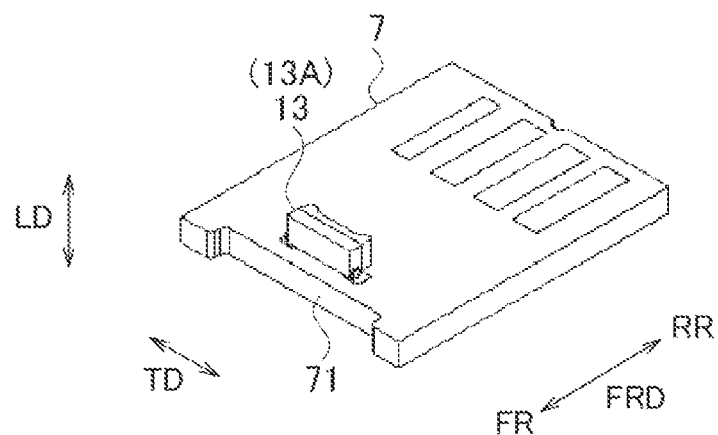
FIG. 5 is a perspective view of a substrate of the lighting device according to the first embodiment of the invention.
Figure 6:
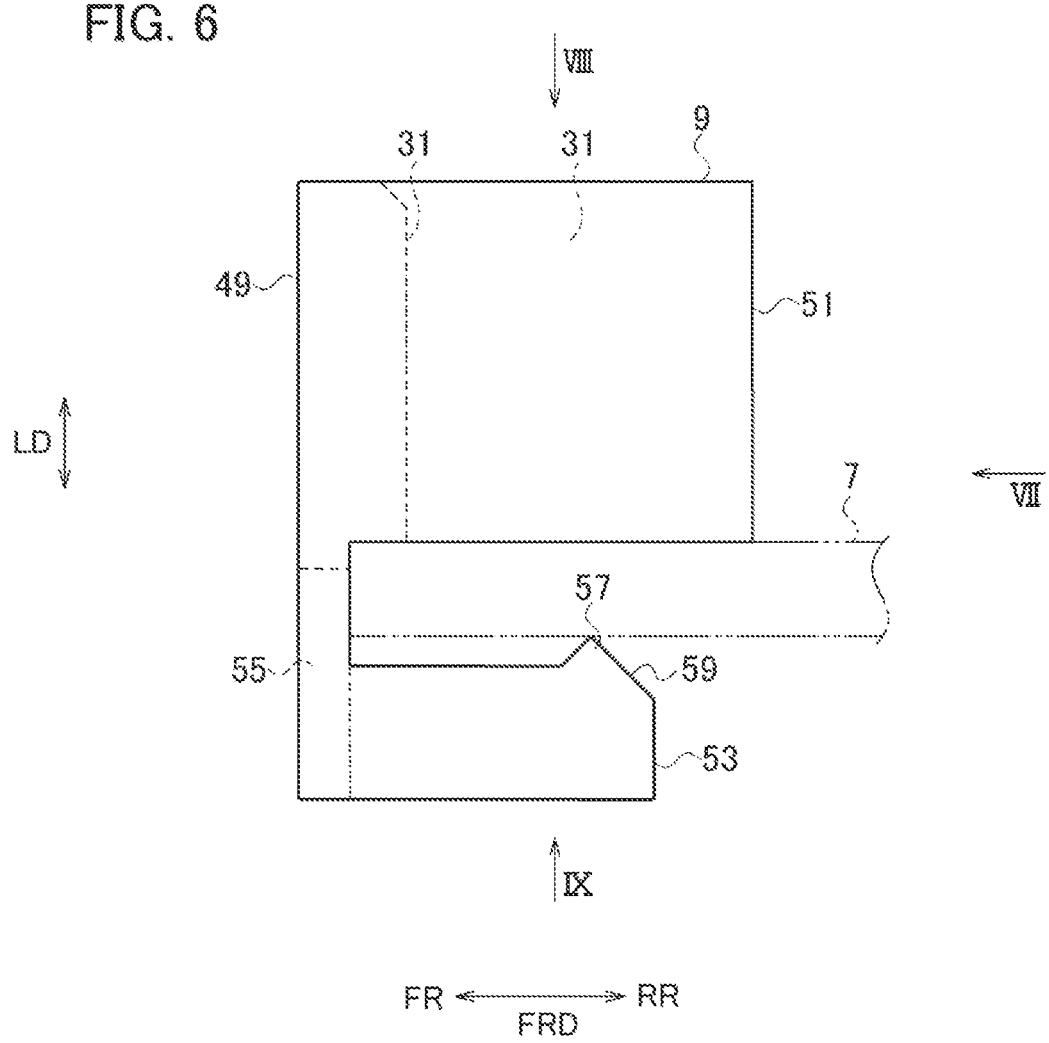
FIG. 6 is a diagram of a cover of the lighting device according to the first embodiment of the invention, viewed from the transverse direction.
Figure 7:
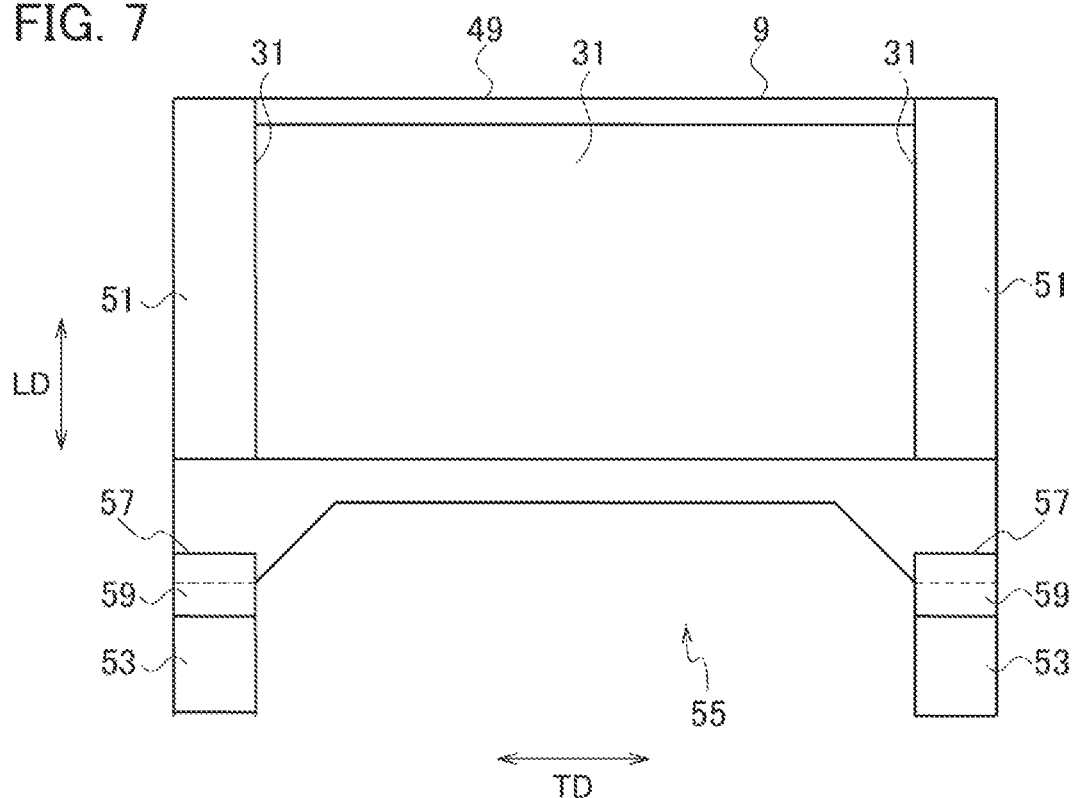
FIG. 7 is an arrow view from the VII direction in FIG. 6.
Figure 8:
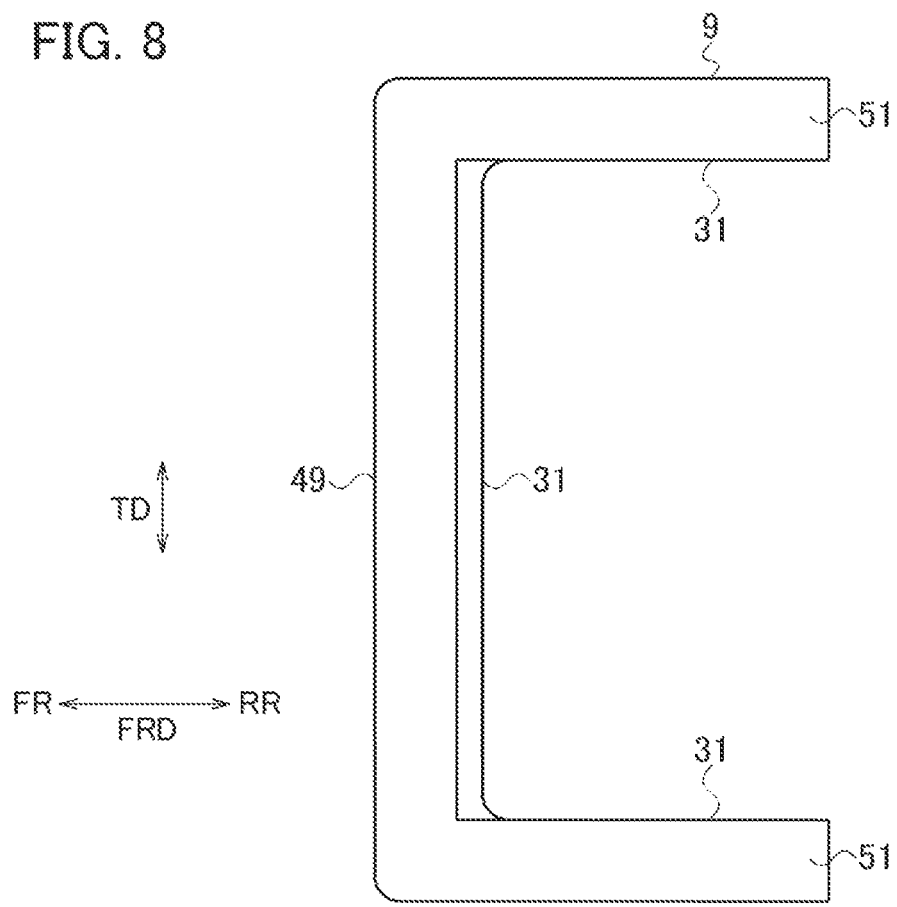
FIG. 8 is an arrow view from the VIII direction in FIG. 6.
Figure 9:
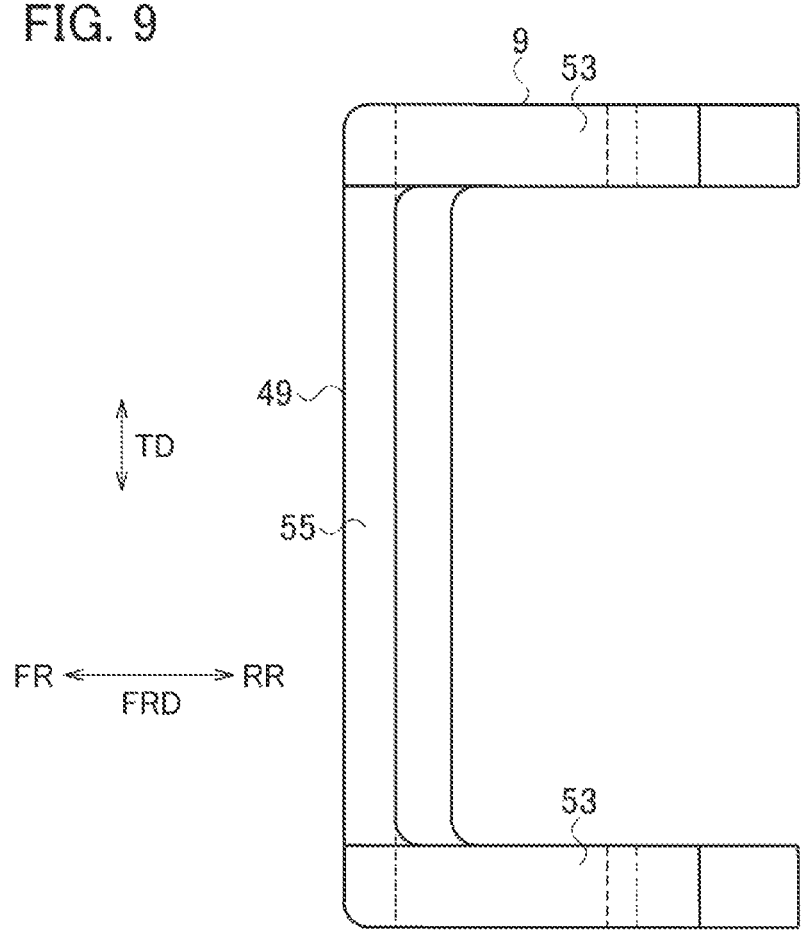
FIG. 9 is an arrow view from the IX direction in FIG. 6.
Figure 15:
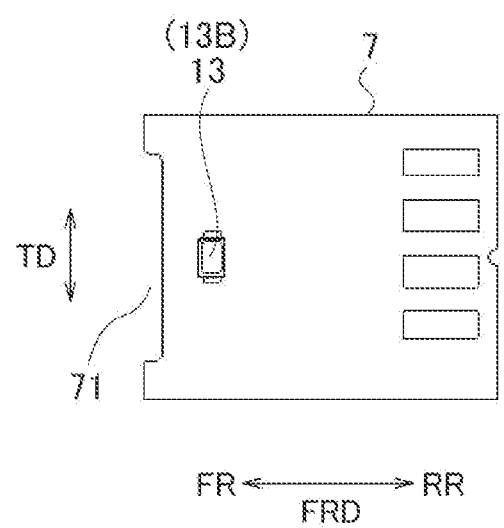
FIG. 15 is a view of the back surface of the substrate of the lighting device according to the first embodiment of the invention.

As illustrated in FIG. 5, the first light emitter 13A is located at the central portion of the substrate 7 in the transverse direction and located at the front end portion of the substrate 7 in the front-rear direction. As illustrated in FIG. 15, the second light emitter 13B is located at the central portion of the substrate 7 in the transverse direction and located at the front end portion of the substrate 7 in the front-rear direction.

The first light emitter 13A is provided for lighting the vehicle charge inlet 3 which is an object to be illuminated for illumination. The second light emitter 13B is used as an indicator (an indicator indicating an amount of charge, for example). Light emitted by the first light emitter 13A comes out from the portion indicated by the reference numeral 73 in FIGS. 1 and 2. Light emitted by the second light emitter 13B comes out from the portion indicated by the reference numeral 75 in FIGS. 1 and 2.

As illustrated in FIGS. 6 to 9, the cover 9 includes a cover body 49, a pair of cover side walls 51, and a pair of arms (arm bodies) 53.

The cover body 49 has a rectangular flat plate shape whose thickness direction is the front-rear direction. A concave portion 55 is formed at the central portion of the cover body 49 in the transverse direction and at a first end which is one end of the cover body 49 in the longitudinal direction. The concave portion 55 is recessed toward a second end which is the other end of the cover body 49 in the longitudinal direction. The concave portion 55 penetrates through the cover body 49 in the front-rear direction. The tip end of the cover body 49 has slopes 69 and is sharp in FIGS. 11, 17, and 18. However, the tip end of the cover body 49 may not be sharp as illustrated in FIG. 5 and other drawings.

The pair of cover side walls 51 respectively have a rectangular flat plate shape whose thickness direction is the transverse direction. The pair of cover side walls 51 protrude rearward from both ends of the cover body 49 in the transverse direction located at the second end side of the cover body 49 in the longitudinal direction. The concave portion 55 of the cover body 49 is away from the pair of cover side walls 51 in the longitudinal direction.

The pair of arms 53 respectively have a flat plate shape whose thickness direction is the transverse direction. The pair of arms 53 are away from the pair of cover side walls 51 in the longitudinal direction. The pair of arms 53 protrude rearward from both ends of the cover body 49 in the transverse direction located at the first end side in the longitudinal direction. The pair of arms 53 having cantilever structures are elastically deformable and capable of bending more than the pair of cover side walls 51.

The pair of arms 53 respectively have protrusions 57. The protrusions 57 are provided in the rear end portions of the pair of arms 53 in the front-rear direction. The protrusions 57 are positioned forward of the rear ends of the pair of cover side walls 51 in the front-rear direction. The protrusions 57 are positioned toward (nearer to) the pair of cover side walls 51 (the second end) in the longitudinal direction. The protrusions 57 respectively have a triangle shape viewed from the transverse direction. The protrusions 57 respectively have slopes 59 at the rear ends thereof. The slopes 59 function as guide surfaces when the cover 9 is installed in the substrate 7.

The central portion of the substrate 7 in the transverse direction at the forward end of the substrate 7 is sandwiched by and between the pair of cover side walls 51 and the pair of arms 53 (specifically, the protrusions 57) with a biasing force. Thus, the cover 9 is press-fitted and integrally installed in the substrate 7.

Figure 16:
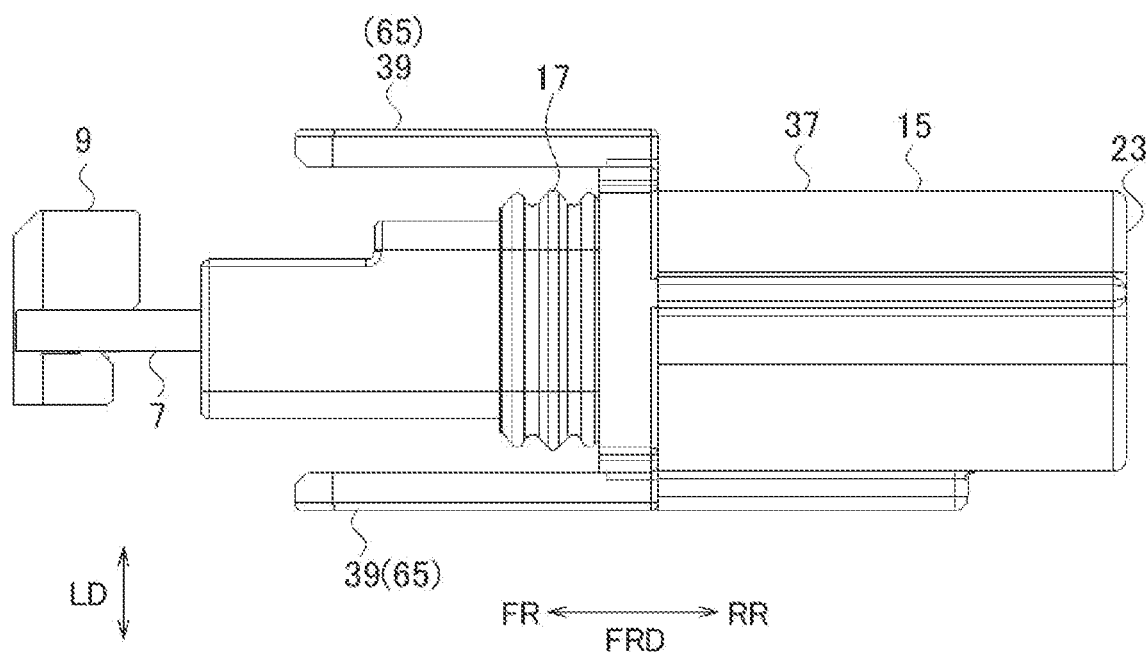
FIG. 16 is a view of the lighting device according to the first embodiment of the invention in which the substrate and the cover have been installed in the housing.
Figure 17:
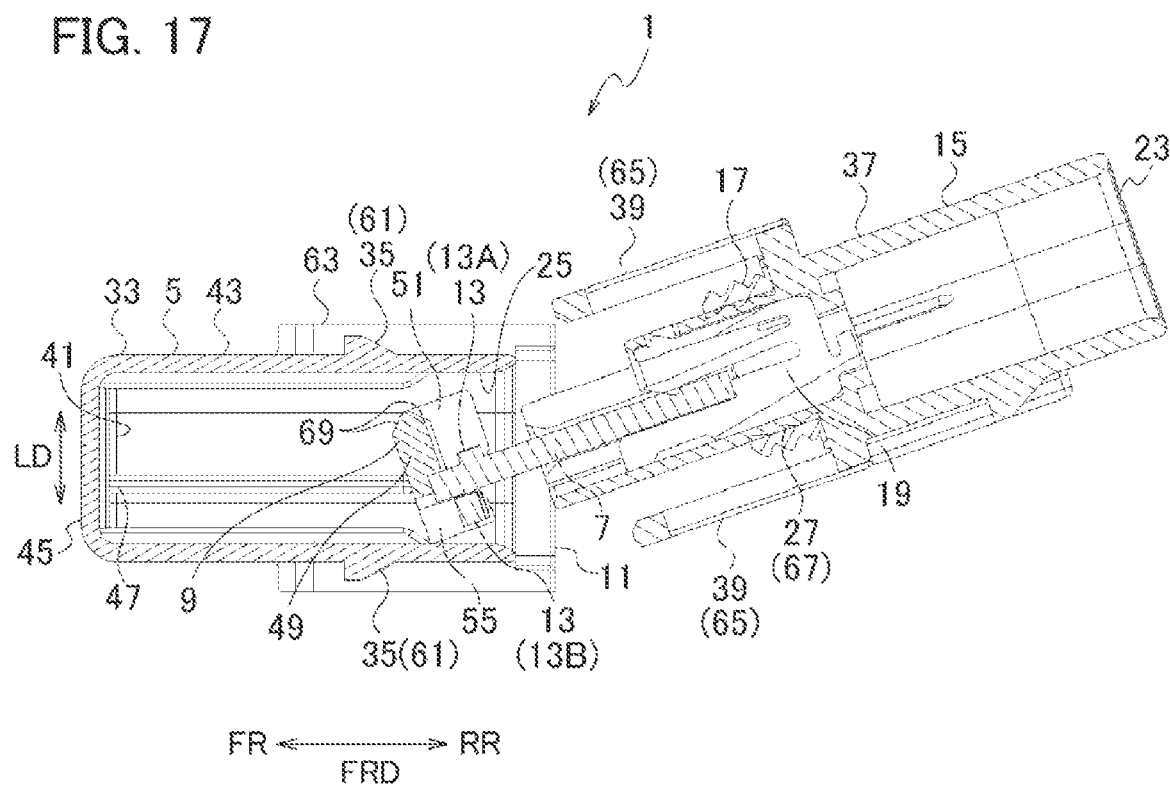
FIG. 17 is a view of the lighting device according to the first embodiment of the invention in which the housing and others illustrated in FIG. 16 are being installed in a case.

In a state where the cover 9 is installed in the substrate 7, the first light emitter 13A is located rearward of the portion of the cover body 49 in which the concave portion 55 is not formed, and is slightly away from the cover body 49 in the front-rear direction (see FIGS. 11, 16, 17, and other drawings). In a state where the cover 9 is installed in the substrate 7, the first light emitter 13A is located between the pair of cover side walls 51 and is slightly away from both the pair of cover side walls 51 in the transverse direction.

A portion of the light emitted by the first light emitter 13A is reflected by the cover body 49 and the pair of cover side walls 51, and then the case 5 is illuminated with the reflected light. The remaining light emitted by the first light emitter 13A is not reflected by the cover body 49 and the pair of cover side walls 51, and the case 5 is directly illuminated with the remaining light emitted by the first light emitter 13A and passing through the space surrounded by the cover body 49 and the pair of cover side walls 51.

In a state where the cover 9 is installed in the substrate 7, the second light emitter 13B is located rearward of the concave portion 55 of the cover body 49 and is slightly away from the concave portion 55 of the cover body 49 in the front-rear direction. In a state where the cover 9 is installed in the substrate 7, the second light emitter 13B is located between the pair of arms 53 and is slightly away from both the pair of arms 53 in the transverse direction (see FIG. 11).

The case 5 is directly illuminated with substantially all of the light emitted by the second light emitter 13B and passing through the concave portion 55 of the cover body 49 without illuminating the cover 9.

Light emitted by the first light emitter 13A is blocked by the substrate 7, the cover body 49 of the cover 9, and the pair of cover side walls 51 of the cover 9, and thus does not reach the back side of the substrate 7. Light emitted by the second light emitter 13B is blocked by the substrate 7 and the pair of arms 53 of the cover 9, and thus does not reach the front side of the substrate 7.

The lighting device 1 will be described in more detail. As illustrated in FIG. 4 and other drawings, the engaged portion 25 of the case 5 is the inner surface of the side wall 43 of the case body 33 located at the rear side. The locked portions 35 of the case 5 are a pair of protrusions 61. As illustrated in FIGS. 3, 4, 13, 17, and 18, the pair of the protrusions 61 respectively protrude from the side wall 43 of the case body 33 (the portions 43A and 43B thereof which face each other and whose thickness direction is the longitudinal direction) in the longitudinal direction. The pair of the protrusions 61 are long in the transverse direction, located at the rear side of the side wall 43 of the case body 33 in the front-rear direction, and located at the central portion of the side wall 43 in the transverse direction. The protrusion 61 is provided in a pair.

Protection walls 63 are respectively provided in the portions 43A and 43B of the side wall 43 of the case body 33. The protection walls 63 are respectively located at the rear side of the portions 43A and 43B in the front-rear direction, and respectively provided at both end portions of the portions 43A and 43B in the transverse direction.

As illustrated in FIG. 4 and other drawings, the engaging portion 27 of the housing 15 is the outer surface of a rectangular tubular portion 67 of the housing body 37. The locking portions 39 of the housing 15 are U-shaped elastic arms (locking claws) 65 having cantilever structures. The elastic arm 65 is also provided in a pair as with the protrusion 61.

In a state where the housing 15 is installed in the case 5, the protrusions 61 are locked by the elastic arms 65, and the protection walls 63 surround and protect the elastic arms 65 which are the locking portions 39 of the housing 15 (see FIG. 3).

The substrate 7 has a recess (a recess for a cover) 71 which is long in the transverse direction (see FIGS. 4, 5, and 15). The recess 71 is formed in the front end portion of the substrate 7 in the front-rear direction and arranged at the central portion of the substrate 7 in the transverse direction. The cover 9 is coupled to the substrate 7 along the recess 71 provided in the substrate 7. That is, the cover 9 is guided by the recess 71 when the cover 9 is installed in the substrate 7.

Next, the assembly of the lighting device 1 will be described.

As an initial state, it is assumed that the packing 17 and the terminals 19 are installed in the housing 15 while the case 5, the substrate 7, and the cover 9 are not installed in the housing 15.

Figure 18:
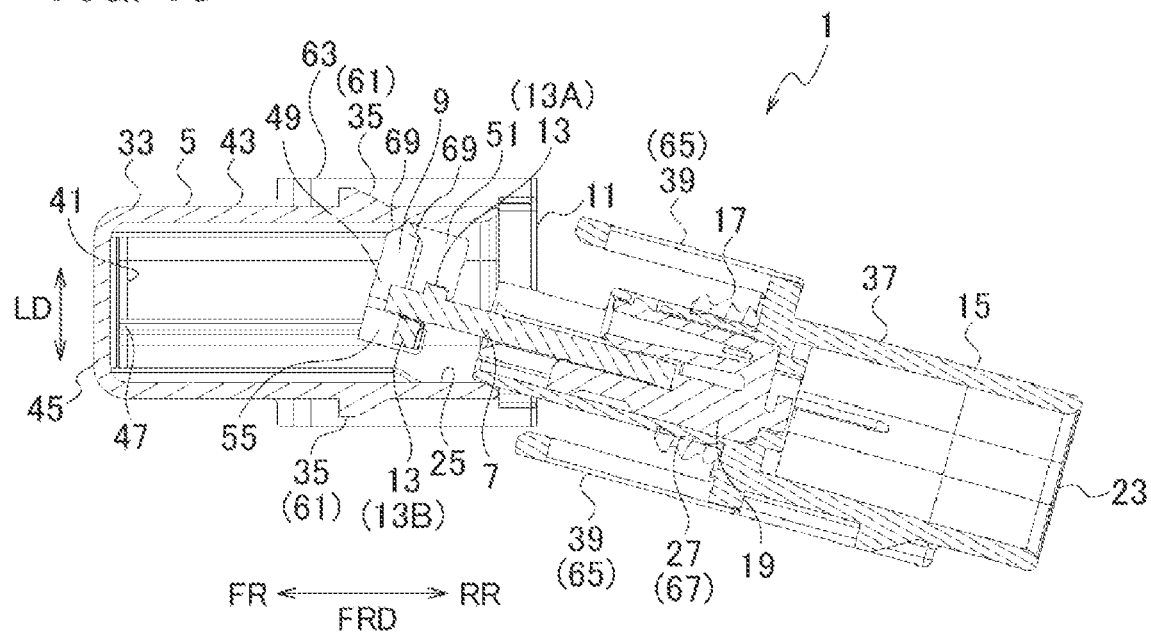
FIG. 18 is a view of the lighting device according to the first embodiment of the invention in which the housing and others illustrated in FIG. 16 are being installed in the case.

The cover 9 is installed in the substrate 7 in the initial state (see FIG. 14). Next, the substrate 7 and the cover 9 are installed in the housing 15 (see FIG. 16). Next, the housing 15, the substrate 7, and the cover 9 are installed in the case 5 as illustrated in FIGS. 17 and 18.

In the lighting device 1, the cover 9 is made from a rigid material such as synthetic resin and installed in the substrate 7 by press-fitting so as to cover the light emitter 13. Thus, when the substrate 7 is installed inside the case 5, even though the cover 9 may come in contact with the case 5, the light emitter 13 does not come in contact with the case 5 and it is therefore possible to prevent damage to the light emitter 13 due to contact of the light emitter 13 with the case 5.

Specifically, the light emitter 13 does not come in contact with the case 5 even when the housing 15 and other components are tilted with respect to the case 5 as illustrated in FIG. 17. The light emitter 13 does not come in contact with the case 5 even when the housing 15 and other components are tilted with respect to the case 5 as illustrated in FIG. 18.

Installation of the cover 9 in the substrate 7 by press-fitting reduces the time required for assembly of the cover 9 to the substrate 7.

Figure 21:
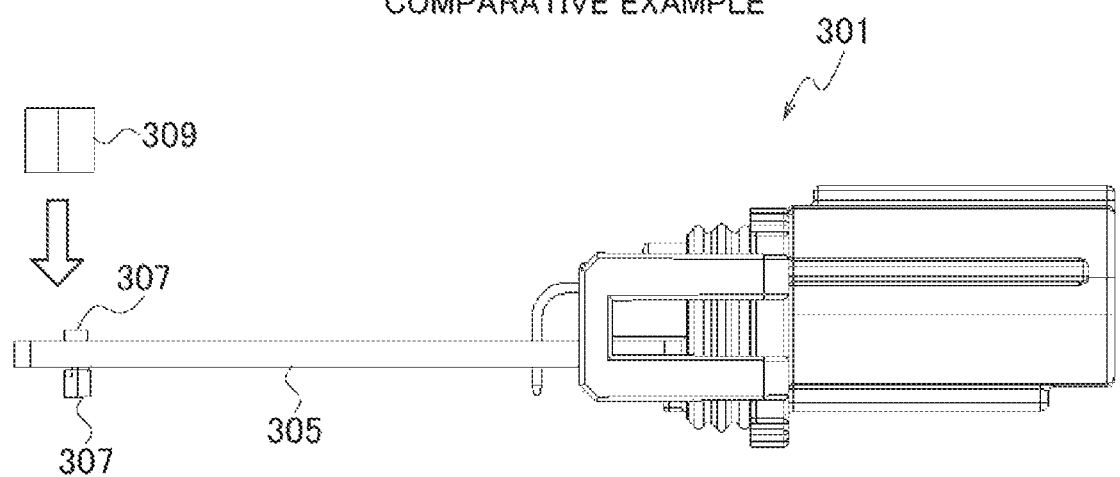
FIG. 21 is a view of a lighting device according to a comparative example.
Figure 22:
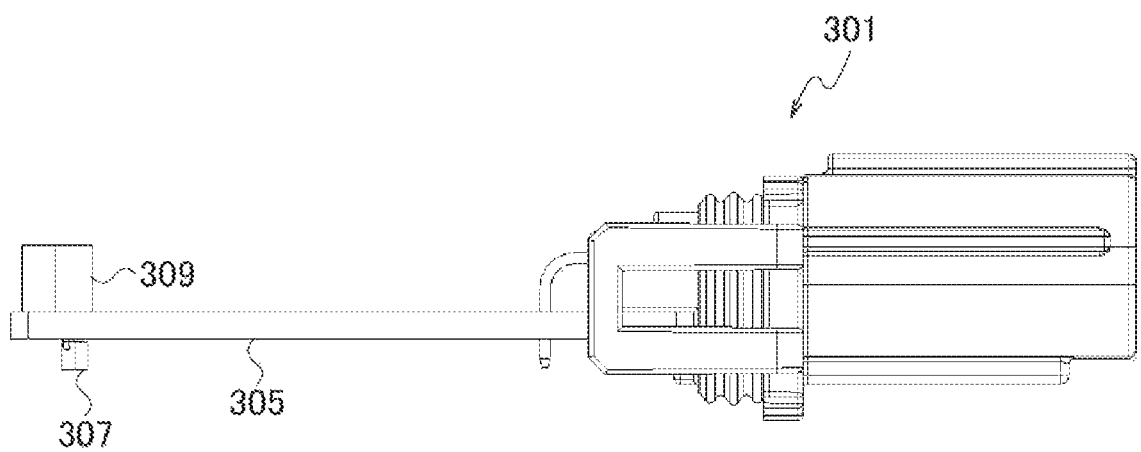
FIG. 22 is a view of the lighting device according to the comparative example.

As illustrated in FIGS. 21 and 22, a lighting device 301 according to a comparative example includes a case 303 having a rectangular cylinder with a closed bottom, and a substrate 305 inserted through the opening of the case 303 and installed inside the case 303.

Figure 23:
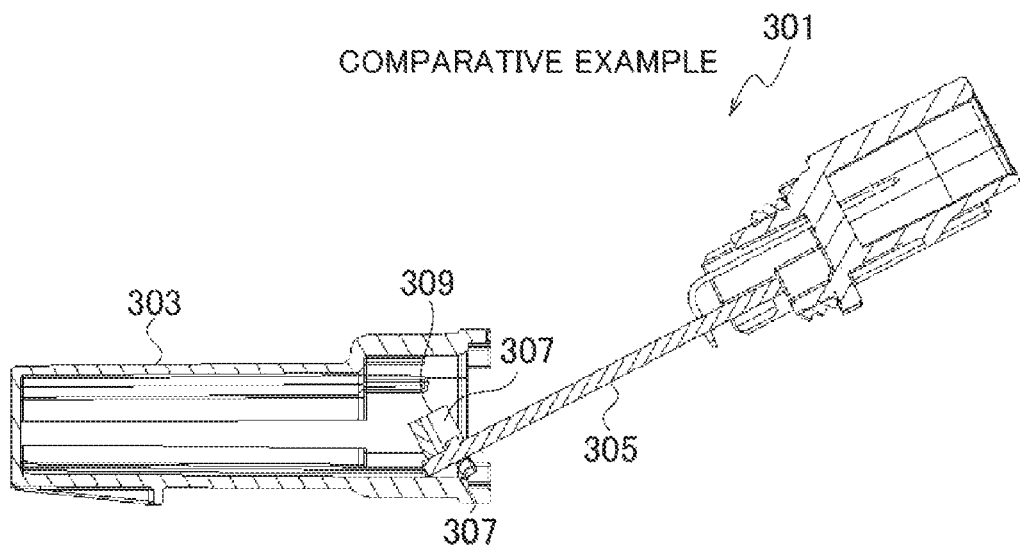
FIG. 23 is a view of the lighting device according to the comparative example.
Figure 24:
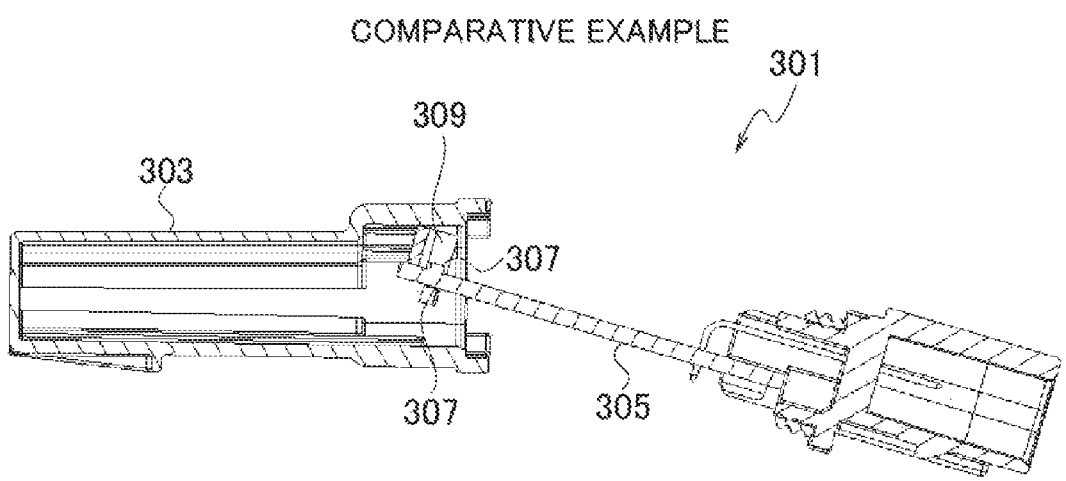
FIG. 24 is a view of the lighting device according to the comparative example.

In the lighting device 301 according to the comparative example, light emitters 307 and a light-shielding wall made of sponge material (sponge) 309 are provided on the substrate 305. The sponge 309 is fixed on the front surface of the substrate 305 so as to surround the light emitter 307. Since the sponge 309 surrounds the light emitter 307, it is possible to prevent damage to the light emitter 307 due to contact of the light emitter 307 with the case 303 when the substrate 305 in which the light emitter 307 is installed is installed inside the case 303 (see FIGS. 23 and 24).

However, in the lighting device 301 according to the comparative example, release paper of double-sided tape is peeled from the sponge 309 and attachment of the sponge 309 on the substrate 305 is performed by manually positioning the sponge 309 on the substrate 305 when the sponge 309 is installed on the substrate 305. Thus, it takes time to install the sponge 309 on the substrate 305.

Furthermore, in the lighting device 301 according to the comparative example, since the sponge 309 absorbs light depending on the color of the sponge 309, the sponge 309 has a good light-shielding function but causes a reduction of the illumination intensity. Furthermore, in the lighting device 301 according to the comparative example, since the sponge 309 is vulcanized, long-term usage may cause chips of the light emitter 307 to corrode and cause a reduction of the illumination intensity and brightness of the light emitter 307.

In the lighting device 1, the illuminated surface 31 of the cover 9 is configured to reflect some or all light emitted by the light emitter 13 and with which the illuminated surface 31 is illuminated. Thus, it is possible to prevent light emitted by the light emitter 13 from being absorbed by the cover 9 as much as possible and prevent a reduction of the illumination intensity due to installation of the cover 9. Furthermore, the cover 9 allows light-shielding in directions in which illumination is unnecessary.

The lighting device 1 does not use a vulcanized sponge(s), and thus a reduction of the illumination intensity and brightness of the light emitter 13 due to long-term usage can be prevented as much as possible.

In the lighting device 1, the thickness direction of the substrate 7 in which the light emitter 13 is installed and which has a thin flat plate shape is the longitudinal direction, and the dimension value L2 of the case body 33 in the longitudinal direction is smaller than the dimension value L1 of the case body 33 in the transverse direction.

In the lighting device 1, the locked portions 35 of the case 5 protrude from both ends of the case body 33 in the longitudinal direction, and the locking portions 39 of the housing 15 protrude from both ends of the housing body 37 in the longitudinal direction. The case 5 is installed in the housing 15 by locking the locked portions 35 to the locking portions 39.

According to the configuration above, it is possible to easily reduce the size of the lighting device 1 (particularly in the transverse direction).

In the lighting device 1, the press-holding ribs 41 for holding the substrate 7 are provided inside the case 5 (the case body 33). Thus, it is possible to increase the rigidity of the case 5 and prevent the substrate 7 from falling off the case 5 at the same time. It is also possible to increase the integrity of the substrate 7 and the case 5 and prevent the substrate 7 from swinging inside the case 5. Particularly, although provision of the cover 9 increases the mass of the portion at the front side of the substrate 7, the tip end portion of the substrate 7 is held with the press-holding ribs 41 and thus it is possible to prevent the tip end portion of the substrate 7 from becoming unstable due to the increased mass.

In the lighting device 1, the first light emitter 13A and the second light emitter 13B are provided as the light emitter 13. The first light emitter 13A is provided on the front surface of the substrate 7 and is configured to emit light toward a direction which is away from the substrate 7 in the longitudinal direction. In the lighting device 1, the second light emitter 13B is provided on the back surface of the substrate 7 which is the other of the surfaces of the substrate 7 in the thickness direction and is configured to emit light toward the front direction.

In the lighting device 1, a portion of the light emitted by the first light emitter 13A is reflected by the cover 9 and then the case 5 is illuminated with the reflected light, and the case 5 is directly illuminated with the remaining light emitted by the first light emitter 13A. The case 5 is directly illuminated with light emitted by the second light emitter 13B.

According to the configuration above, it is possible to prevent a reduction of the illumination intensity of the case 5 obtained by emitting from the first light emitter 13A and a reduction of the illumination intensity of the case 5 obtained by emitting from the second light emitter 13B as much as possible.

In the lighting device 1, the first light emitter 13A is provided for lighting the vehicle charge inlet 3 which is an object to be illuminated for illumination, and the second light emitter 13B is used as an indicator. Thus, the lighting device 1 can be appropriately used as a lighting device for lighting the vehicle charge inlet 3 and a device for indicating an amount of battery charge of a vehicle.

In the lighting device 1, the cover 9 includes the cover body 49 in which the concave portion 55 is formed, the pair of cover side walls 51, and the pair of arms 53. The cover 9 is installed in the substrate 7 in a state where the forward end of the substrate 7 is sandwiched by and between the pair of cover side walls 51 and the pair of arms 53 with a biasing force. Thus, the cover 9 can be installed in the substrate 7 by press-fitting with a simple configuration.

In the lighting device 1, the first light emitter 13A is located rearward of the cover body 49 in the front-rear direction and located between the pair of cover side walls 51 in the transverse direction. A portion of the light emitted by the first light emitter 13A is reflected by the cover body 49 and the pair of cover side walls 51, and then the case 5 is illuminated with the reflected light. Thus, with a simple configuration, it is possible to prevent the first light emitter 13A from coming into contact with the case 5 when the substrate 7 is installed in the case 5, and prevent a reduction of the illumination intensity of the case 5 obtained by emitting from the first light emitter 13A.

In the lighting device 1, the second light emitter 13B is located rearward of the concave portion 55 of the cover body 49 in the front-rear direction and located between the pair of arms 53 in the transverse direction. The case 5 is directly illuminated with substantially all of the light emitted by the second light emitter 13B and passing through the concave portion 55 of the cover body 49. Thus, with a simple configuration, it is possible to prevent the second light emitter 13B from coming into contact with the case 5 when the substrate 7 is installed in the case 5, and prevent a reduction of the illumination intensity of the case 5 obtained by emitting from the second light emitter 13B.

In the lighting device 1, light emitted by the first light emitter 13A is blocked by the substrate 7, the cover body 49 of the cover 9, and the pair of cover side walls 51 of the cover 9, and thus does not reach the back side of the substrate 7. Light emitted by the second light emitter 13B is blocked by the substrate 7 and the pair of arms 53 of the cover 9, and thus does not reach the front side of the substrate 7.

According to the configuration above, it is possible to prevent mixture (color mixture) of light emitted by the first light emitter 13A and light emitted by the second light emitter 13B, and particularly assure a function as an indicator. That is, it is possible to prevent erroneous indication in an indicator which uses light emitted by the first light emitter 13A.

Figure 19:
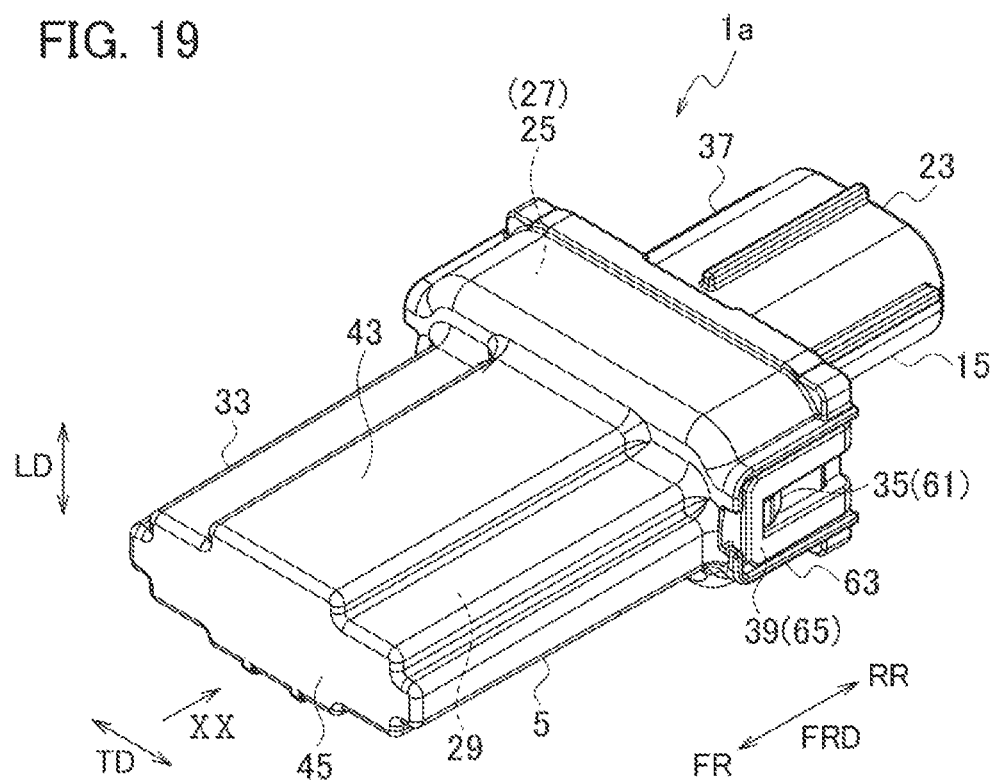
FIG. 19 is a perspective view of a lighting device according to a second embodiment of the invention.
Figure 20:
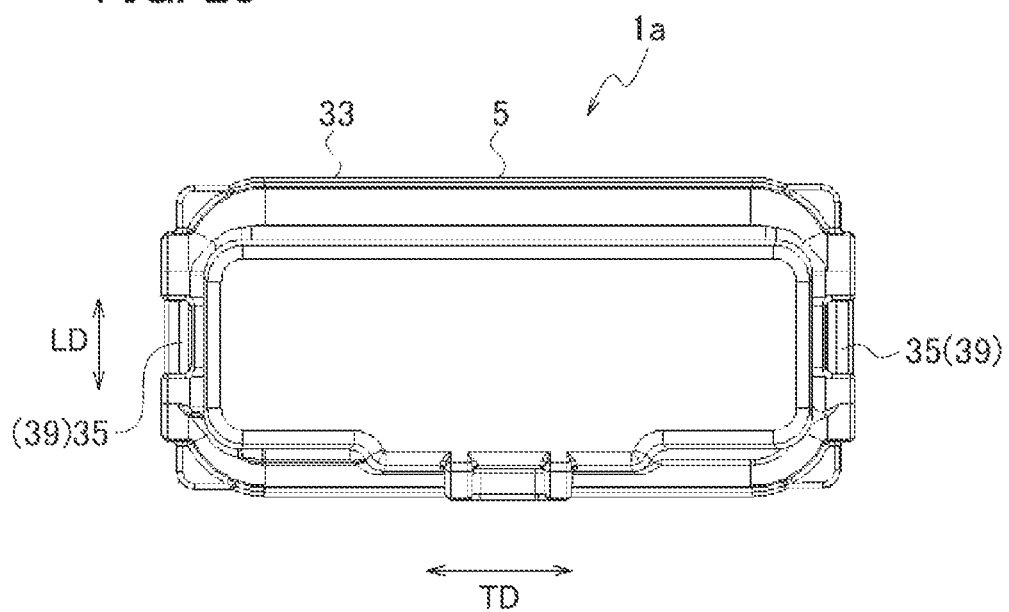
FIG. 20 is an arrow view from the XX direction in FIG. 19.

Next, a lighting device 1a according to a second embodiment of the present invention will be described by referring FIGS. 19 and 20. The lighting device 1a according to the second embodiment of the present invention has the same configuration as the lighting device 1 according to the first embodiment of the present invention other than the positions of the locked portions 35 of the case 5 and the positions of the locking portions 39 of the housing 15.

In the lighting device 1a according to the second embodiment, the locked portions 35 of the case 5 protrude from both ends of the case body 33 in the transverse direction, and the locking portions 39 of the housing 15 protrude from both ends of the housing body 37 in the transverse direction.

The case 5 is installed in the housing 15 by locking the locked portions 35 to the locking portions 39.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lighting device comprising:
   a case made from a material allowing light to penetrate therethrough and having a cylinder shape with a closed bottom;
   a substrate including a light emitter configured to emit light; and a cover made from a rigid material, press-fitted and installed in the substrate so as to cover the light emitter, and installed inside the case together with the substrate, wherein the cover covers a first end of the substrate located at a forward side in a direction in which the substrate is inserted in the case without covering a second end of the substrate.

2. The lighting device according to claim 1, wherein
the cover has an illuminated surface which is a surface to be illuminated with light emitted by the light emitter, and
the illuminated surface is configured to reflect some or all light emitted by the light emitter and with which the illuminated surface is illuminated.

3. The lighting device according to claim 1, further comprising a housing including a housing body and locking portions, wherein
the case includes a case body and locked portions,
the case body has a rectangular box shape,
a dimension value of the case body in a transverse direction is greater than a dimension value of the case body in a longitudinal direction,
a dimension value of the housing body in the transverse direction is greater than a dimension value of the housing body in the longitudinal direction,
the locked portions respectively protrude from both ends of the case body in the longitudinal direction,
the locking portions respectively protrude from both ends of the housing body in the longitudinal direction, and
the case is installed in the housing with the locked portions being locked by the locking portions.

4. The lighting device according to claim 1, wherein a press-holding rib configured to press-hold the substrate is provided inside the case.

5. The lighting device according to claim 1, wherein
the light emitter includes a first light emitter and a second light emitter,
the first light emitter is provided on a front surface of the substrate,
the first light emitter is configured to emit light from the front surface of the substrate toward a direction which is away from the substrate in the longitudinal direction,
the second light emitter is provided on a back surface of the substrate,
the second light emitter is configured to emit light from the back surface of the substrate in a front direction,
the case is illuminated with a portion of light emitted by the first light emitter and reflected by the cover, and the case is directly illuminated with remaining light of the light emitted by the first light emitter, and
the case is directly illuminated with light emitted by the second light emitter.

6. The lighting device according to claim 5, wherein
the first light emitter is provided for lighting a vehicle charge inlet which is an object to be illuminated for illumination, and
the second light emitter is used as an indicator.

7. The lighting device according to claim 5, wherein the cover includes:
a cover body having a flat plate shape whose thickness direction is a front-rear direction, the cover body having a concave portion at a central portion of the cover body in a transverse direction and at a first end which is one end of the cover body in the longitudinal direction, the concave portion being recessed toward a second end which is the other end of the cover body in the longitudinal direction;
a pair of cover side walls each having a flat plate shape whose thickness direction is the transverse direction, the pair of cover side walls protruding rearward from both ends of the cover body in the transverse direction located toward the second end in the longitudinal direction; and
a pair of arms each having a flat plate shape whose thickness direction is the transverse direction, the pair of arms being away from the pair of cover side walls in the longitudinal direction and protruding rearward from both ends of the cover body in the transverse direction located toward the first end in the longitudinal direction,
the cover is installed in the substrate with a forward end of the substrate being sandwiched by and between the pair of cover side walls and the pair of arms, the forward end being the first end of the substrate,
the first light emitter is located rearward of the cover body in the front-rear direction,
the first light emitter is located between the pair of cover side walls in the transverse direction,
the case is illuminated with a portion of light emitted by the first light emitter and reflected by the cover body and the pair of cover side walls,
the second light emitter is located rearward of the concave portion of the cover body in the front-rear direction,
the second light emitter is located between the pair of arms in the transverse direction, and
the case is illuminated with light emitted by the second light emitter and having passed through the concave portion of the cover body.

8. The lighting device according to claim 1, wherein the lighting device is used for illumination of a vehicle charge inlet.

9. The lighting device according to claim 1, wherein
the light emitter is protruded from a portion of a surface of the substrate,
the portion is closer to the first end than to the second end, and
the first end is opposite to the second end across the surface.

10. The lighting device according to claim 9, wherein the cover fully covers the first end of the substrate.

11. A lighting device comprising:
a case made from a material allowing light to penetrate therethrough and having a cylinder shape with a closed bottom;
a substrate including a light emitter configured to emit light; and
a cover made from a rigid material, press-fitted and installed in the substrate so as to cover the light emitter, and installed inside the case together with the substrate, wherein
the light emitter includes a first light emitter and a second light emitter,
the first light emitter is provided on a front surface of the substrate,
the first light emitter is configured to emit light from the front surface of the substrate toward a direction which is away from the substrate in the longitudinal direction,
the second light emitter is provided on a back surface of the substrate,
the second light emitter is configured to emit light from the back surface of the substrate in a front direction,
the case is illuminated with a portion of light emitted by the first light emitter and reflected by the cover, and the case is directly illuminated with remaining light of the light emitted by the first light emitter, the case is directly illuminated with light emitted by the second light emitter, the cover includes:
- a cover body having a flat plate shape whose thickness direction is a front-rear direction, the cover body having a concave portion at a central portion of the cover body in a transverse direction and at a first end which is one end of the cover body in the longitudinal direction, the concave portion being recessed toward a second end which is the other end of the cover body in the longitudinal direction;
- a pair of cover side walls each having a flat plate shape whose thickness direction is the transverse direction, the pair of cover side walls protruding rearward from both ends of the cover body in the transverse direction located toward the second end in the longitudinal direction; and
- a pair of arms each having a flat plate shape whose thickness direction is the transverse direction, the pair of arms being away from the pair of cover side walls in the longitudinal direction and protruding rearward from both ends of the cover body in the transverse direction located toward the first end in the longitudinal direction, the cover is installed in the substrate with a forward end of the substrate being sandwiched by and between the pair of cover side walls and the pair of arms, the first light emitter is located rearward of the cover body in the front-rear direction, the first light emitter is located between the pair of cover side walls in the transverse direction, the case is illuminated with a portion of light emitted by the first light emitter and reflected by the cover body and the pair of cover side walls, the second light emitter is located rearward of the concave portion of the cover body in the front-rear direction, the second light emitter is located between the pair of arms in the transverse direction, and the case is illuminated with light emitted by the second light emitter and having passed through the concave portion of the cover body.

\* \* \* \* \*